United States Patent [19]

Mizuno et al.

[11] Patent Number: 4,929,874
[45] Date of Patent: May 29, 1990

[54] VIBRATION CONTROL SYSTEM

[75] Inventors: Keiichiro Mizuno, Tokyo; Kazuyoshi Iida; Kazutomo Murakami, both of Yokohama, all of Japan

[73] Assignee: Bridgestone Corporation, Tokyo, Japan

[21] Appl. No.: 247,562

[22] Filed: Sep. 22, 1988

[30] Foreign Application Priority Data

Sep. 25, 1987 [JP] Japan .................................. 62-241479

[51] Int. Cl.$^5$ ...................... F16M 13/00; B64C 17/06
[52] U.S. Cl. ...................................... 318/128; 310/51; 73/668; 318/649
[58] Field of Search ................. 73/583, 602, 658, 660, 73/668; 188/267; 248/560, 610, 638, 550; 310/51; 318/114, 128, 629, 649

[56] References Cited

U.S. PATENT DOCUMENTS

| | | | |
|---|---|---|---|
| 4,010,637 | 3/1977 | Harwell et al. | 73/658 |
| 4,488,240 | 12/1984 | Kapadia et al. | 73/583 |
| 4,795,123 | 1/1989 | Forward et al. | 73/668 |
| 4,796,873 | 1/1989 | Schubert | 248/550 |
| 4,803,409 | 2/1989 | Horikawa | 318/649 |

Primary Examiner—Patrick R. Salce
Assistant Examiner—D. L. Rebsch
Attorney, Agent, or Firm—Sughrue, Mion, Zinn, Macpeak & Seas

[57] ABSTRACT

A vibration control system for damping vibration of an body to be isolated against vibration. The body is supported on a movable base through the medium of vibration-damping supporting structure. The control system comprises a vibration sensor for detecting vibration of the movable base. An inverse vibration signal generating circuit includes a digital sensor and in supplied with a detection signal outputted from the vibration sensor for generating a signal with a waveform to cancel out the vibration of the body through interference therewith. An actuator is connected operatively to the movable base and the inverse vibration signal generating circuit for converting the signal derived from the latter into a mechanical vibration to be applied to the body.

5 Claims, 5 Drawing Sheets $Z^{-1}$ : DELAY ELEMENT
$a_0 \sim a_{n-1}$ : FILTER FACTOR MULTIPLIER

REAL TRANSFER FUNCTION

DIGITAL FILTER TRANSFER FUNCTION

COMPENSATING CHANNEL TRANSFER FUNCTION

VIBRATION CONTROL SYSTEM

BACKGROUND OF THE INVENTION

1. Field of the Invention

The present invention generally relates to a vibration control system for a body or an object which is supported on a movable base (also referred to as foundation or groundwork) and which is to be isolated from vibration. More particularly, the invention is concerned with a vibration control system for actively reducing the vibration of a body to thereby ensure a great reduction of the vibration against which the body is to be isolated.

2. Description of the Concerned Art

In conjunction with the vibration absorbing or damping structures for reducing vibrations and noise transmitted from prime movers, driving machines or the like to the environment, or protecting cargo on board in the course of transportation by trucks or freight cars from vibration or preventing vibration from being transmitted to an electron microscope or precision apparatus such as integrated circuit (IC) manufacturing equipment and others, it is known to support the body with a vibration isolator to be protected from the vibration by means of an elastic member constituted by a vibration isolating rubber, metallic spring or the like and/or by interposing a damper, as the case may be.

FIG. 8 of the drawing shows schematically one of the typical one of the vibration isolating supports known heretofore, and FIG. 9 illustrates the frequency characteristic of vibration transmissibility (vibration response ratio) of the structure shown in FIG. 8.

Referring to FIG. 8, the vibration damping support known in the art is implemented in a passive structure in the sense that a body 1 to be protected against vibration which is transmitted from a vibration source or foundation 3 is supported by an elastic member 2 having a spring constant K and a damping coefficient C and interposed between the body 1 and the base or foundation 3. With such a supporting structure, however, a maximum vibration response, i.e. resonance takes place at a frequency $f_0$ determined in accordance with $f_0 = \sqrt{K/M}/2\pi$ (where M represents the mass of the body 1). The result of which is that the vibration transmitted to the body 1 is not damped but undesirably amplified at or in the vicinity of this frequency $f_0$, involving a more serious situation, to great disadvantage.

Under the circumstances, there has been recently proposed and adopted in practical applications an elastic supporting structure in which the spring constant K and the damping coefficient C of the elastic member 2 are rendered variable or adjustable (i.e. a so-called semi-active support).

However, the semi-active support can not avoid the occurrence of resonance when the vibration originating in the base or foundation includes various frequency components over a wide frequency range or band, as exemplified by random vibration. In other words, when the frequency band of the vibration of concerned is broad, there exists unavoidably a frequency at which resonance can take place. Consequently, the vibration tends to be amplified rather than damped at or in the vicinity of the resonance frequency, whereby the body is subjected to intensive vibration, giving rise to a serious problem.

Thus, with the passive or semi-active vibration damping structure known heretofore, it is impossible or very difficult to realize effectively the reduction of vibration over a wide frequency range in a satisfactory manner.

SUMMARY OF THE INVENTION

In light of the problems of the concerned art described above, it is therefore an object of the present invention to provide a vibration control system which can attenuate or reduce actively the vibration of a supporting structure over a wide range of frequencies, to thereby protect actively a body supported thereon from the vibration.

With the above object in view, there is provided according to a general aspect of the present invention a vibration control system for isolating a body from the vibration transmitted thereto, which body is supported on a foundation through the medium of vibration isolating support, which control system comprises a vibration sensor for detecting vibration of the foundation, inverse vibration signal generating device supplied with the detection signal outputted from the vibration sensor for generating an inverse vibration signal of such a waveform which can cancel out the vibration transmitted to the body through interference therewith, and an actuator connected operatively to the body and the inverse vibration signal generating device for converting the inverse vibration signal derived from the signal generating means into a mechanical vibration to be applied to the body for thereby decreasing the vibration thereof.

In a preferred embodiment of the invention, the inverse vibration signal generating device may include a digital filter.

The above and other objects, features and attendant advantages of the present invention will be more apparent from the following detailed description of the preferred embodiments of the invention taken, by way of example only, in conjunction with the accompanying drawings.

BRIEF DESCRIPTION OF THE DRAWINGS

In the course of the following description, reference is made to the drawings, in which.

DESCRIPTION OF THE PREFERRED EMBODIMENTS

Now, the present invention will be described in detail in conjunction with exemplary and preferred embodiments thereof by reference to FIGS. 1 to 7.

Figure 1:
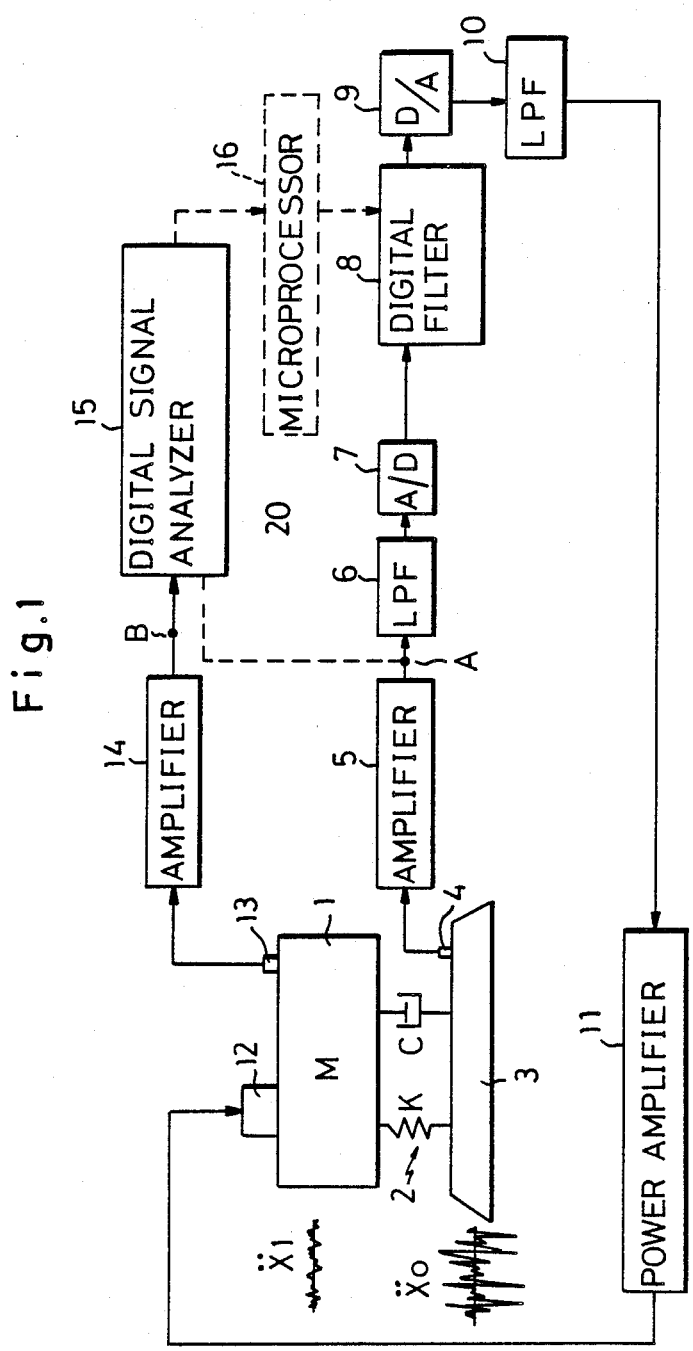
FIG. 1 shows in a block diagram a general arrangement of a vibration control system according to an exemplary embodiment of the present invention.

FIG. 1 shows schematically in a block diagram a general arrangement of a vibration control system according to an exemplary embodiment of the present invention.

In FIG. 1, a body 1 having a mass M to be isolated from vibration is supported on foundation or groundwork 3 susceptible to vibration through the medium of a vibration-isolating elastic supporting member 2 having a spring constant K and a damping coefficient C. With a supporting structure only, vibration of the groundwork 3 is unavoidably transmitted to the body 1 for the reason described hereinbefore in conjunction with the prior art. Accordingly, it is contemplated with the present invention to provide additionally an inverse vibration generating circuit generally designated by a reference numeral 20 for generating and applying actively an inverse vibration to the body 1 through an actuator 12 operatively connected thereto for thereby cancelling to a high degree the vibration transmitted to the body 1 from the foundation 3.

The inverse vibration generating circuit 20 is composed of a vibration sensor 4 for detecting vibration of the foundation 3, an amplifier 5 for amplifying the detection signal outputted from the vibration sensor 4, a low-pass filter (LPF) 6 having the input connected to the output of the amplifier 5, an analogue-to-digital (A/D) converter 7 for converting the analogous output of the low-pass filter 6 to a digital signal, a digital filter 8 having the input connected to the output of the A/D converter 7, a digital-to-analogue (D/A) converter 9 for converting the digital signal output from the digital filter 8 to an analogue signal, a low-pass filter (LPF) 10 connected to the output of the D/A converter 9, and a power amplifier 11 for amplifying the output of the low-pass filter 10, wherein the output of the power amplifier 11 is supplied to the vibrational actuator 12 mentioned above. The digital filter 8 is designed to pass therethrough only the vibration signal components having frequencies within a predetermined frequency range (band) while eliminating other vibration components to thereby derive a desired vibration waveform.

As will be appreciated from the above description, the inverse vibration generating circuit 20 is implemented in such arrangement that the vibration is the foundation 3 as detected by the vibration sensor 4 is processed by the digital filter 8 so that the signal of the waveform is generated which can cancel out the vibration transmitted to the body 1 under protection from the movable foundation 3 by way of the vibration-isolating elastic supporting member 2. The waveform signal thus generated is applied to the actuator 12, after having been amplified through the power amplifier (signal amplifier) 11. The actuator 12 in turn responds to the input waveform signal by applying the inverse vibration to the body 1 under protection, to cancel out the vibration applied thereto from the foundation 3.

By applying actively or positively the vibration to the body 1 under protection on the basis of the signal produced by the inverse vibration generating circuit 20, the vibration applied to the latter from the movable foundation 3 by way of the elastic supporting member 2 is substantially cancelled out due to interference with the vibration applied by the actuator 12, as the result of which the vibration of the body 1 under protection can be significantly reduced.

Figure 2:
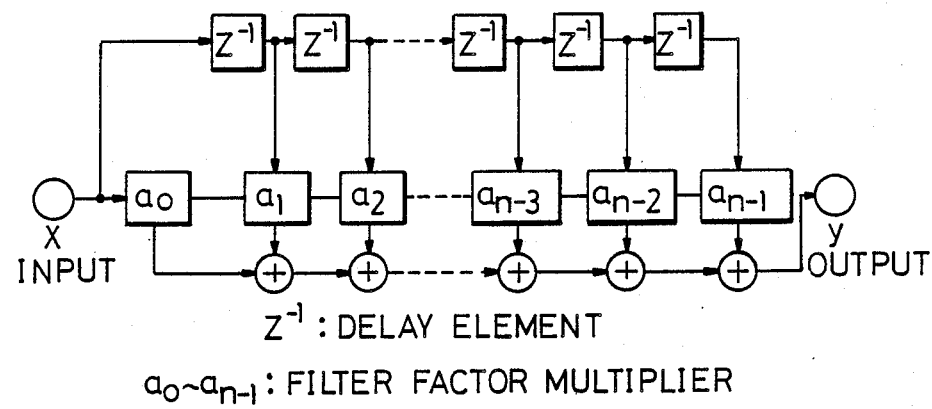
FIG. 2 is a view for illustrating a circuit configuration of a digital filter employed in the system shown in FIG. 1.

In the inverse vibration signal generating circuit 20 described above, the digital filter 8 plays the most important role of generating the waveform for the inverse vibration. FIG. 2 shows in a block diagram a circuit configuration of this digital filter 8, by way of example.

Figure 3:
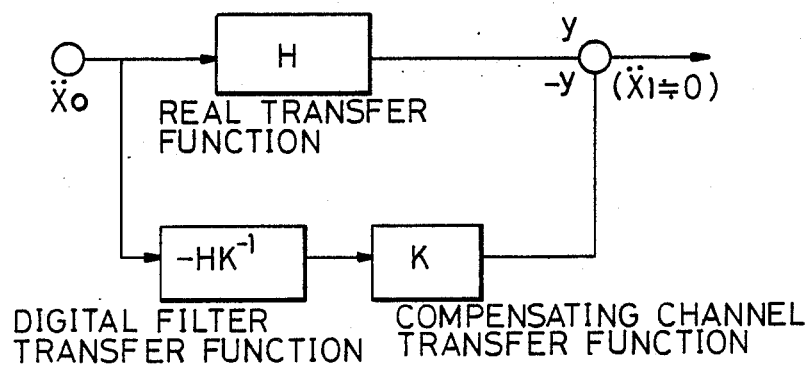
FIG. 3 is a block diagram for illustrating shcematically the vibration control (damping) function of the system shown in FIG. 1.

Referring to FIG. 2, the illustrated digital filter 8 is implemented in the form of an FIR-type filter, by way of example, which can operate to convert an input signal x to a desired output signal y by determining appropriately a filtering factor $a_i$ (where i represents a given integer selected from 0 to n - 1). In other words, it is necessary to first determine the filtering factor $a_i$. FIG. 3 is a functional diagram for illustrating a process of determining the filtering factor $a_i$.

Now, a process of determining the filtering factor $a_i$ will be described stepwise by referring to FIGS. 1 and 3.

(i) First, vibration of the movable foundation 3 is detected by the sensor 4 in the state in which the actuator 12 is deenergized, while vibration of the body 1 to be protected from vibration is detected by a sensor 13 having the output connected to an amplifier 14, wherein a transfer function is measured between the output of the amplifier 5 (a circuit point A in FIG. 1) and the output of the amplifier 14 (a circuit point B in FIG. 1). This transfer function is represented by H.

(ii) Subsequently, a signal representative of the vibration of the movable foundation 3 is recorded by a data recorder and is applied to the circuit point A shown in FIG. 1. A transfer function of a path extending from the circuit point A to the circuit point (B) by way of the low-pass filter 6, the A/D converter 7, the digital filter 8, the D/A converter 9, the low-pass filter 10, the power amplifier (signal amplifier) 11, the actuator 12, the body 1, the vibration sensor 13 for the body 1 and the amplifier 14 in this order is measured. This transfer function is represented by K (FIG. 3) and referred to as the transfer function of the compensating channel.

(iii) The transfer functions H and K determined through the measurements described above are then subjected to a fast inverse Fourier transform, whereby impulse response of the resultant transfer function—H and that of the inverse transfer function $K^{-1}$ are calculated, the results of which are then subjected to convoluting integration. In this manner, the filtering factor $a_i$ (i=0 to n - 1) shown in FIG. 2 can be determined. The transfer function of the digital filter 8 can then be represented by $-HK^{-1}$ (FIG. 3).

With the filtering factor $a_i$ of the digital filter 8 thus determined, vibration transmitted to the body 1 from the foundation 3 through the elastic supporting member 2 can be canceled out through interference by applying thereto the vibration $x_0$ of the movable foundation 3 after having passed through the inverse vibration generating circuit 20 extending from the vibration sensor 4 to the actuator 12. As the result, vibration of the body 1 can be reduced significantly.

Referring to FIG. 3, when the compensating channel including the digital filter 8 and the actuator 12 (extending from the circuit point A to the circuit point B by way of the digital filter 8 and the actuator 12, as well as other interposed elements, and having the transfer function K) is not activated, the vibration $x_0$ of the movable foundation 3 is outputted as the signal y through the elastic supporting member 2 having the real transfer function H. On the other hand, upon activation of the compensating channel described above, vibration $x_0$ of the movable foundation 3 passes through the compensating channel having the transfer function K and including the digital filter 8 which has the transfer function $-HK^{-1}$, whereby the vibration $(-y)$ is ultimately outputted.

Since the vibration $(-y)$ is additively combined with the vibration (y) outputted through the real transfer function H, the vibration $(x_1)$ of the body 1 is significantly reduced, ideally to zero.

In practice, however, the digital filter 8 suffers from various errors inclusive of error or tolerance involved in the implementation. Consequently, synthesization of the vibrations (y and $-y$) will not necessary result in zero but assume a definite value, which however is extremely small. Thus, the excellent vibration damping or reducing effect can be attained.

It should be mentioned that the method of determining the filtering factor $a_i$ of the digital filter is not restricted to the method elucidated hereinbefore, but also other processes may be adopted to this end.

When the dynamic characteristics of the vibration control system varies, bringing about changes in the transfer function moment by moment, it is also possible to measure sequentially the changes in the transfer function K of the path extending from the circuit point A to the circuit point B i.e. the transfer function of the compensating channel). Thus arithmetically the filtering factor $a_i$ can be determined at a high speed with the aid of a microprocessor 16. In accordance with the results of the arithmetic determination, the filtering factors of the digital filter 8 are sequentially updated. In that case, the digital filter 8 is implemented in the form of an adaptive digital filter in which the filtering factors $a_i$ are correctively updated sequentially in accordance with the changes in the influential conditions. Thus, the teachings of the present invention can effectively be applied to the system whose dynamic characteristics undergo change as a function of time lapse.

It should further be added that a digital signal processor destined only for the adaptive filter may be employed to automatically determine the filtering factor from time to time, directly on the basis of the input signals derived from the circuit points A and B shown in FIG. 1, without resorting to the use of the transfer functions. By using this type of signal processor, it is possible to implement the inverse vibration generating circuit 20 in a much simplified structure.

Figure 4:
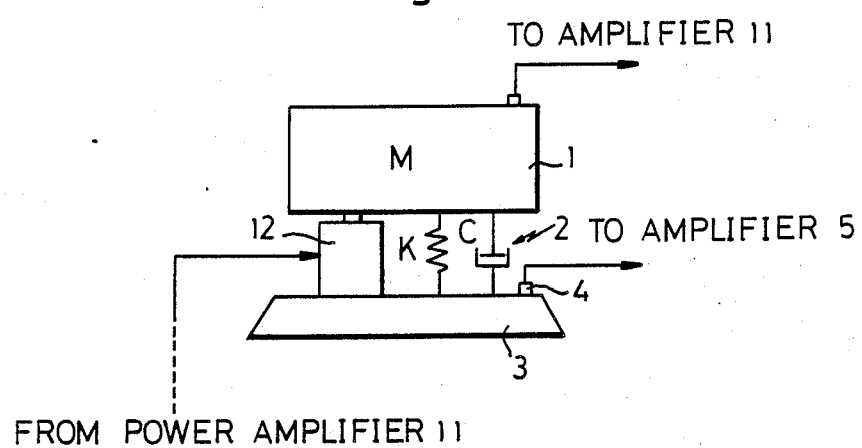
FIG. 4 shows a main portion of the vibration control system according to another embodiment of the present invention.

FIG. 4 shows a main portion of the vibration control system according to another embodiment of the present invention which differs from the system shown in FIG. 4 in respect to the disposition of the actuator 12. More specifically, the actuator 12 for applying the inverse or cancelling vibration to the body 1 under protection is disposed between the movable foundation 3 and the body 1 in parallel with the vibration damping elastic supporting member 2.

As will be appreciated from the foregoing description made in conjunction with the exemplary embodiments of the present invention, there has been provided according to the present invention a so-called active vibration control system in which the vibration transmitted to the body 1 under protection from the movable foundation 3 through the elastic supporting member 2 is actively reduced by applying the inverse vibration to the body 1 through the actuator 12, excitation of which in turn is controlled on the basis of the vibration detected by the sensor 4.

More specifically, the inverse vibration applied to the body 1 by the actuator 12 is generated by driving the actuator 12 with the signal of such waveform which can reduce or cancel the vibration transmitted to the body 1 through the elastic supporting member 2 and which can be derived by passing the signal detected by the vibration sensor 4 adapted to detect the vibration of the movable foundation 3 through the digital filter 8.

Figure 5:
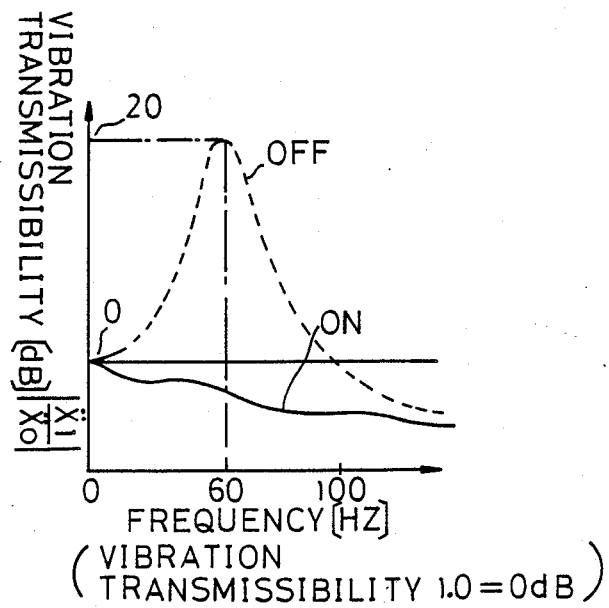
FIG. 5 is a chart for graphically illustrating the frequency characteristic of the vibration response ratio of a supporting structure to which the present invention is applied.
Figure 6:
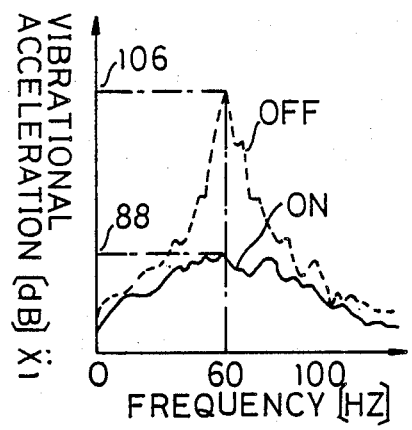
FIG. 6 is a chart for graphically illustrating the frequency characteristic of vibrational acceleration of a supporting structure to which the present invention is applied.

FIG. 5 shows graphically the vibration response ratio $|X/X_0|$ of the body 1 to the vibration transmitted from the foundation 3 in the states in which the vibration control system according to the invention is turned on and off (refer to curves labelled "ON" and "OFF"), respectively. FIG. 6 shows graphically the results of measurements of acceleration components of vibration of the body 1 when the vibration control system according to the invention is operating, in comparison with the corresponding results obtained in the state in which the inventive control system is not turned on. In both FIGS. 5 and 6, the band of vibration frequencies from which the body 1 is to be protected is taken in the range of DC to 100 Hz. As is apparent from the results of the measurement shown in FIG. 5 (curve labelled "ON"), a vibration isolating or damping supporting structure exhibiting the vibration response ratio not greater than 1.0 and thus undergoing no resonance can be realized by applying the teachings of the present invention. On the other hand, it is seen from FIG. 6 that acceleration of vibration $x_1$ of the body 1 itself can be significantly reduced (e.g. about 18 dB at the frequency of 60 Hz) according to the invention (refer to the curve labelled "ON"). In this way, a remarkable vibration reducing effect can be accomplished.

Figure 7:
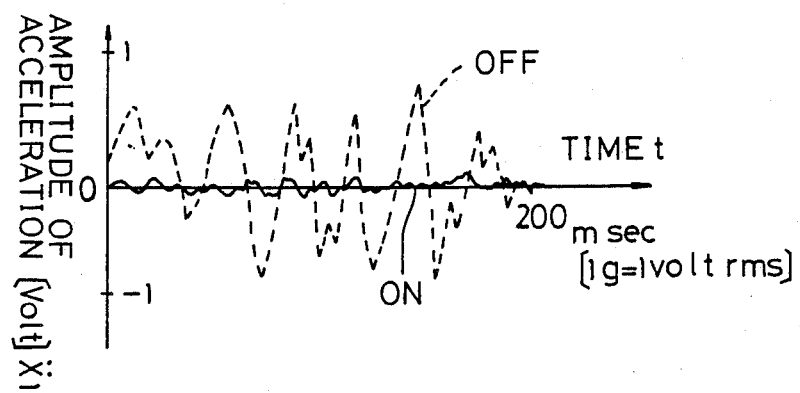
FIG. 7 is a chart for graphically illustrating the time-amplitude characteristic of vibrational acceleration taking place in a supporting structure to which the present invention is applied.
Figure 8:
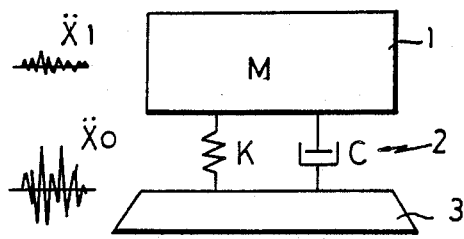
FIG. 8 is a shcematic diagram showing a structure of a vibration damping support known heretofore.
Figure 9:
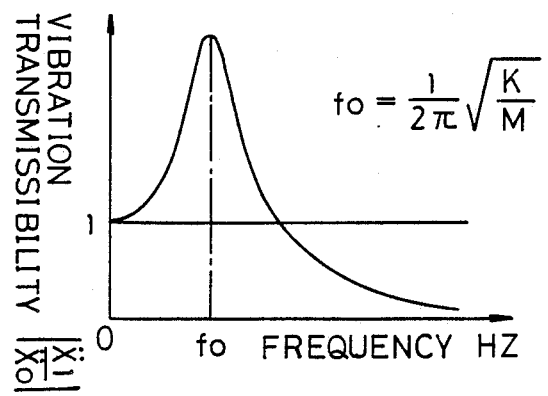
FIG. 9 is a chart for illustrating the vibration response ratio in the known vibration damping support shown in FIG. 8.

FIG. 7 illustrates graphically the results of measurements performed on the amplitude of vibrational acceleration of the body 1 in the state where the vibration control system according to the invention is effectuated (curve "ON"), comparatively with the state in which the control system is turned off (curve labelled "OFF"). This figure also demonstrates that the amplitude of the vibrational acceleration is extremely small on the order of the level of noise when the inventive system is operated (see the curve labelled "ON"). Thus, the vibration to which the body 1 is subjected can be decreased significantly.

As will not be appreciated from the foregoing description, transmission of vibration to the body under protection from the movable foundation can be actively and significantly reduced over a wide range of frequencies by virtue of an arrangement such that the vibration of the movable foundation is detected by a vibration sensor. The detection signal passes through a digital filter for generating a vibration of waveform capable of cancelling out the vibration of the body under protection through intereference therewith, wherein the generated vibrational waveform is applied to the actuator operatively coupled to the body.

It will be recognized by those of skill in the art that numerous modifications and adaptations may be made to the various structures and the systems disclosed herein as well as in the method of operation thereof and thus it is intended by the appended claims to encompass all such modifications which fall within the true spirit and scope of the present invention.

We claim:

1. A vibration control system for isolating or damping vibration of a body to be protected from the vibration, said body being supported on a movable foundation through the medium of a vibration isolating supporting structure, comprising:
   a vibration sensor for detecting vibration of said movable foundation;
   an inverse vibration signal generating device supplied with the detection signal output from said vibration sensor for generating a vibration signal of such a waveform as to cancel out the vibration of said body through interference therewith; and
   an actuator connected operatively to said body and said inverse vibration signal generating device for converting said vibration signal derived from said inverse vibration signal generating device into a mechanical vibration to be applied to said body to thereby decrease the vibration thereof.

2. A vibration control system set forth in claim 1, wherein said actuator is disposed in parallel with said vibration isolating supporting structure between said movable foundation and said body.

3. A vibration control system set forth in claim 1, wherein said inverse vibration signal generating device includes a digital filter having a filtering factor determined such that a signal of waveform capable of cancelling out the vibrational waveform transmitted to said body from said foundation is generated by said inverse vibration signal generating device.

4. A vibrational control system set forth in claim 3, wherein said digital filter is implemented by a microprocessor.

5. A vibration control system set forth in claim 3 or 4, wherein the filtering factor of said digital filter is adjustable in dependence on an output signal of a sensor intended for detecting vibration of said body.

* * * * *